Jan. 4, 1955 S. N. VAN VOORHIS 2,698,931

SYNCHRONIZER FOR INDICATORS

Filed May 9, 1945

*INVENTOR.*
STANLEY N. VAN VOORHIS
*BY*
Ralph L Chappell
ATTORNEY 2,698,931

SYNCHRONIZER FOR INDICATORS

Stanley N. Van Voorhis, Rochester, N. Y., assignor, by mesne assignments, to the United States of America as represented by the Secretary of the Navy Application May 9, 1945, Serial No. 592,794

4 Claims. (Cl. 343—6)

This invention relates to a means for displaying at a second cathode ray tube the data appearing on a first cathode ray tube which is remotely separated from the second cathode ray tube.

A system of this character is highly applicable to military operations, particularly naval operations. For instance, a scouting plane bearing radio echo apparatus can be employed to keep the carrier ship informed of obstacles normally out of the range limit of shipborne detection apparatus. It has been found that for a most comprehensive record of remote obstacles, "Plan Position Indicating" apparatus is most advantageously used herein. This type of radio echo gear consists primarily of a rotating antenna transmitting a highly directive energy beam in phase correspondence with a rotating radial sweep on a cathode ray tube. In accordance with the principles of this type of apparatus the angular displacement of the sweep with respect to a given reference line corresponds to the orientation of the antenna and therefore indicates obstacle bearing, while the distance along the sweep line from the starting point, i. e. the center of the cathode ray tube, is taken to represent range.

It is therefore an object of this invention to provide a means for transmitting the data appearing on one cathode ray tube to a second cathode ray tube.

It is another object of this invention to provide a means for synchronizing the electron beam sweeps of two cathode ray tubes remotely separated from each other.

It is another object of this invention to provide a means for synchronizing both the production and the rotation of radial beam sweeps of two cathode ray tubes remotely separated from each other.

Other objects and features will become apparent upon a careful consideration of the following detailed description when taken together with the accompanying drawings the figures of which are designed for the express purpose of illustration and are not to be taken as a definition of the limits of the invention. Reference for the latter purpose is to be had to the appended claims.

The present invention, for purposes of avoiding confusion, is described as applied between aircraft and ship. It must be understood, however, that the invention will function equally well between ship and shore, ship and ship, or aircraft and shore. Hence, hereinafter in the specification and claims when the word "craft" is used, it is meant to embrace both air and naval craft.

Figure 1:
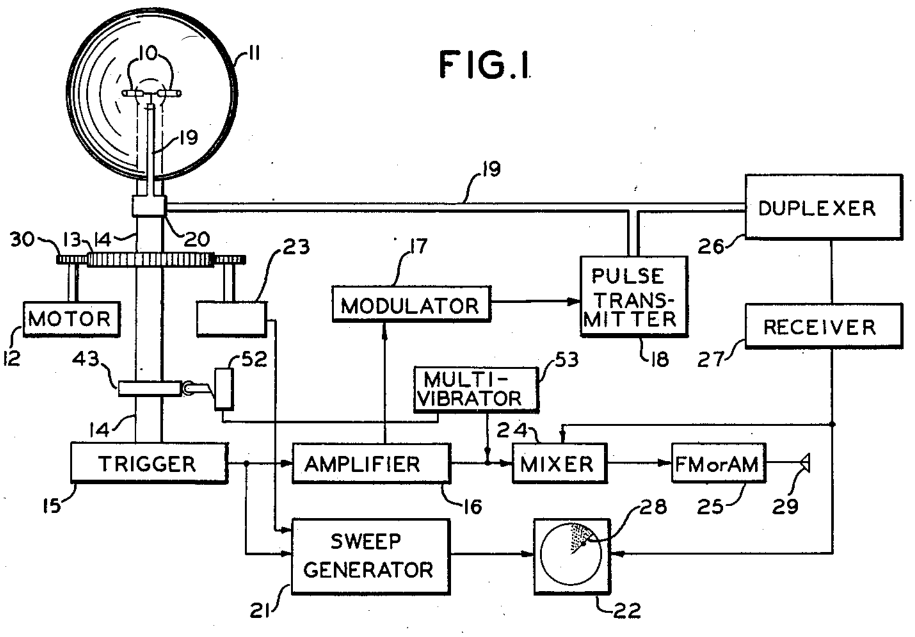
Fig. 1 is a block diagram of the transmitting station wherein the original data is recorded on the first cathode ray tube.

Reference is had more particularly to Fig. 1 wherein there is shown a typical embodiment of the present invention as employed at the transmitting station of the system herein described for displaying the data appearing on one cathode ray tube at a second cathode ray tube remotely separated from the first cathode ray tube. There is included at the transmitting station, for purposes of obtaining range data on the first cathode ray tube, a radio echo detection system of the type hereinbefore outlined comprising a pulse transmitter 18 coupled, for example, to a suitable dipole antenna 10 by way of a low-loss transmission line 19, and through an electrical rotary point, such as a pair of slip rings. The output of the pulse transmitter, for purposes of maintaining a fixed relationship between antenna orientation and obstacle bearing, is concentrated into a highly directive energy beam by means of, for example, a parabolic reflector 11. In scanning a circular expanse about a given point, namely the transmitting station, the antenna assembly is mounted on a rotatable shaft 14 and secured to gear 13 which in turn is driven by a suitable motor 12 and drive gear 30 meshed with the antenna drive gear 13. In practice it has been found that optimum operation of the system is obtained with the antenna rotational speed set at approximately 20 R. P. M.

There is also coupled to the antenna shaft 14 a trigger circuit 15 for use in keying the pulse transmitter 18 and also as a means for maintaining a systematic relation between antenna rotation and the pulse repetition rate of transmitter 18. For instance, 480 pulse per second output from transmitter 18 has often been used with the above selected antenna speed of 20 R. P. M. which indicates a 1440:1 step up between antenna speed and pulse output. The trigger circuit may comprise, for example, a toothed wheel geared to the antenna shaft 14 (the required step up gear ratio being used) arranged to cut a magnetic field having a winding associated therewith so as to induce a voltage pulse in the winding for each interruption of the field by the toothed wheel. The output of the trigger circuit 15 is fed into a pulse shaping amplifier 16 and into a modulator 17 for keying the transmitter 18.

The output of the trigger circuit 15 is also coupled to a saw-tooth generator 21 for producing a linear sweep 28 of the electron beam of cathode ray tube 22 each time the transmitter 18 is fired and in synchronism therewith. In accordance with the principles of radio echo systems, a receiver 27 is coupled to the antenna 10 by way of a duplexing device 26 which is now known to the art and enables transmission and reception to be carried on from a single antenna. Thus energy reflections caused by the transmitted pulse striking remote objects, are received by antenna 10, amplified by receiver 27 and applied to the beam sweep of cathode ray tube 22. As a consequence an observer will see on the sweep 28 of cathode ray tube 22 an indication of the transmitted pulse followed by a series of energy reflections, provided that there are present within the path of the transmitted pulse obstacles capable of producing reflections.

In accordance with the preferred type of radio detection apparatus hereinbefore outlined, rotation of the radial sweep 28 of the cathode ray beam in phase correspondence with the rotation of the antenna 10 is required. This may be accomplished by any one of a number of ways, for example, a sine wave potentiometer 23 may be geared to the antenna drive gear 13 to produce a pair of quadrature sine waves for modulating the saw-tooth output of generator 21. Or if the cathode ray tube 22 is of the magnetic yoke deflection type the magnetic yoke may be geared to the antenna.

In transmitting the data appearing on the cathode ray tube 22 the output from the pulse shaping amplifier 16 is fed into a mixer 24 to modulate an F. M. or A. M. carrier wave emitted at antenna 29 by the F. M. or A. M. transmitter 25. Also applied to the mixer 24 for purposes of modulating the carrier output of transmitter 25, is the video output of receiver 27. Thus each trigger pulse and the ensuing energy reflections caused by the respective transmitted pulse from transmitter 18, is therefore radiated from antenna 29 in the proper time phase.

As will become more apparent in connection with the description below of the operation of the remote cathode ray tube unit, it is desirable to be able to separate there the trigger signals and the energy reflection signals. Accordingly it is advantageous that the modulation produced by the one should differ either in type or degree from that produced by the second class of signal. In one particular embodiment, I have found it advantageous to permit both trigger signals and video signals to produce frequency modulation of the transmitter 25, but to so arrange the mixer 24 that the maximum deviation which may be produced by the video signals is limited to a value less than that produced by the trigger signals. It will at once be apparent to those skilled in the art that various other arrangements may be employed equally well to permit the later separation of the two signals.

Figure 2:
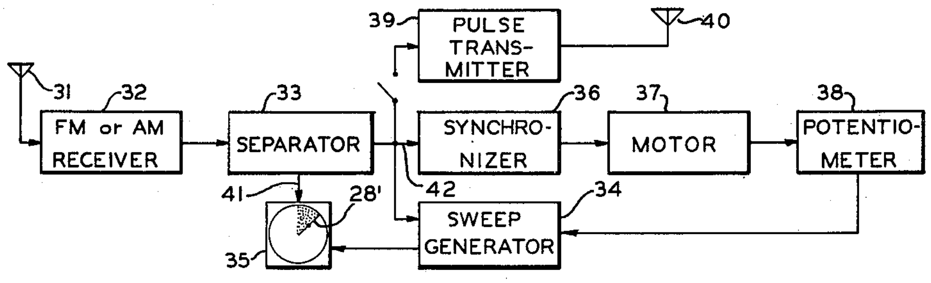
Fig. 2 is a block diagram of the receiving station wherein the second cathode ray tube is located.

At the receiving station, shown in Fig. 2, the second cathode ray tube 35 is located, remotely separated from the first cathode ray tube 22, and on which it is desired to record the data appearing on the first cathode ray tube.

Fixed at the receiving station is an F. M. or A. M. receiver 32, depending on the type communication transmitter 25 used at the transmitting station, coupled to the antenna 31 for use in amplifying and detecting the trigger pulse and video signals emitted by the transmitter 25 in Fig. 1. The detected output of the receiver 32 is fed into a separator 33 for use in separating the trigger pulses from the video signals, and may comprise, in the specific embodiment mentioned above, a pair of thermionic vacuum tubes having their inputs connected in parallel, one of the tubes being biased to cut-off so that only the high amplitude trigger pulses are passed while the other may be biased for class A operation to pass both trigger pulses and video signals. Other combinations of degree or type of modulation at the transmitter will require the appropriate arrangement of the separator circuit. The trigger output from the separator 33 as taken from lead 42 is used to key the sweep generator 34 and thereby initiate the radial sweep, for example, 28' on the cathode ray tube 35, while the video output from the separator 33 as taken from lead 41 is also applied to the cathode ray tube 35. Thus on each sweep line there will appear an indication of the trigger pulse followed by its respective video signals in the proper time phase.

In accordance with another feature of the invention, sweep 28' of cathode ray tube 35 is to be rotated in synchronism with sweep 28 of the cathode ray tube 22. This may be accomplished by utilizing a portion of the trigger output from separator 33 as taken from lead 42 and apply it to the synchronizer 36, the elements of which are shown in block in Fig. 3 which is to be described hereinafter. The synchronizer 36 functions to produce, for example, a 60 cycle voltage by frequency division of the 480 cycle trigger pulse and applied to the motor 37. Motor 37 is geared through a properly chosen gear combination to a sine wave potentiometer 38, for instance, to produce a twenty cycle per minute voltage output therefrom in accordance with the selected rotational speed of the antenna 10 and sweep line 28 at the transmitter station shown in Fig. 1. The output from sine wave potentiometer 38 consists of a pair of quadrature varying voltages used to modulate the saw-tooth output from sweep generator 34 and thereby cause angular movement of the sweep 28' in synchronism with sweep 28. If, however, a magnetic deflecting yoke is used on cathode ray tube 35, motor 37 may then be geared through the properly chosen gear combination to the yoke.

Figure 3:
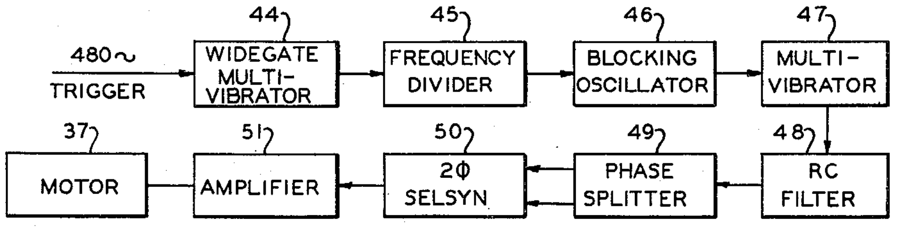
Fig. 3 is a block diagram illustrating in greater detail typical embodiments of the synchronizer shown in Fig. 2.

Reference is now had to Fig. 3 wherein there is shown a block diagram of the synchronizer 36 contained in Fig. 2. Synchronizer 36 may, for example, comprise a wide gate multivibrator 44 keyed by the 480 cycle trigger pulse from the separator 33. The output of the multivibrator 44 is fed into a frequency divider 45 having preferably a 4 to 1 division factor, which in turn keys a blocking oscillator 46 having a time constant set for 60 cycle operation. The 60 cycle output of blocking oscillator 46 is then applied to a second multivibrator 47 which produces a 60 cycle square wave output. The output of the second multivibrator is filtered by way of a suitable R–C filter network 48 to produce a 60 cycle sine wave which is then split into a pair of quadrature varying voltages by way of phase splitter 49 and applied to the stators of a two-phase selsyn motor 50. The single phase output from the selsyn 50 as taken from the rotor is then fed into the potentiometer drive motor 37 by way of amplifier 51.

When the transmitting station is airborne or shipborne, synchronization between the rotating radial sweeps of the transmitter and receiver may be lost upon rapid turns of the craft, or as a result of momentary failure of the radio transmission system, thereby causing the pattern on the receiving cathode ray tube to shift slightly. If this occurs synchronization may be restored by rotating by hand the rotor of the selsyn 50 thus changing the frequency of the applied voltage at the potentiometer drive motor 37. The pattern will then drift into position and remain there as the rotor is stopped.

Another feature of the present invention which is highly applicable for use at the transmitting station when airborne or shipborne installation is employed, is a means for indicating the course of the craft at the receiving station. Such a means is shown in Fig. 1 and comprises a cam 43, a micro-switch 52 and a multivibrator 53. Cam 43 is secured to the antenna shaft 14 and fixed in phase correspondence with the antenna 10, while the microswitch 52 is fixed on the craft in axial relation with the fore and aft axis in such a manner that each time antenna 10 is oriented into the course of the craft cam 43 actuates microswitch 52. Microswitch 52 in turn operates multivibrator 53 the output of which is applied to the mixer 24 to modulate the carrier wave being emitted at antenna 29.

Therefore, the observer at the receiving station will see as a course marker a highly illuminated sweep line or a series of intense dots on a sweep line depending upon the periodicity of the multivibrator 53, and provided, of course, that intensity modulation is used at the cathode ray tube 35. Thus by means of radio communications the pilot of the craft can inform the observer at the receiving station of his true course which will enable the observer at the receiving station to set the course marker in correspondence on the receiving cathode ray tube 35 by rotating the tube, thereby fixing all other signals on the receiving tube in a similar relation as those occupied by signals at the transmitting station.

Still another feature embodied by the present invention is a means for measuring the distance the transmitting station is from the receiving station. Such a means is shown in Fig. 2 and may comprise a pulse transmitter 39 capable of emitting a signal which may be picked up by antenna 10 and receiver 27, keyed by the trigger pulse from the separator 33 and which thereby emits a pulse from antenna 40. The pulse from antenna 40 is picked up at the transmitting station by antenna 10 applied to receiver 27 where it is in turn used to modulate the carrier wave from antenna 29 and subsequently received by the communications receiver 32 and applied to the cathode ray tube 35 as a video signal indicating directly the range of the transmitting station.

From the foregoing description it becomes obvious that an observer at the receiving station who is aware of the range, bearing, and course of the transmitting station has readily available the information required in constructing a graphical plot to aid tactical operations.

Although I have shown and described the present invention as applied to a radio echo system, it must be understood that it will function equally well for any such system wherein it is desired to display data appearing on one cathode ray tube to a second cathode ray tube irrespective of the source from which the data was originally obtained. Therefore this invention is not to be restricted except insofar as necessitated by the prior art or appended claims.

What I claim is:

1. A radar relay system for presenting on a remotely located cathode ray tube search data obtained by a radar system including a transmitter of pulsed energy, a rotating antenna for scanning an area with said energy, and a receiver of echo signals from targets upon which said energy impinges, comprising, means coupled to said antenna producing a series of pulses, the repetition rate of which is a predetermined multiple of the rate of rotation of said antenna, means operable by the rotation of said antenna periodically generating a positional signal indicative of the rotational position of said antenna, a mixing circuit, means applying said series of pulses, said positional signals and said echo signals to said mixing circuit, a source of carrier energy, said mixing circuit being coupled to said source of carrier energy whereby said carrier energy is modulated by the output of said mixing circuit, a remotely located receiver responsive to said carrier energy, circuit means coupled to said remote receiver separating said series of pulses from said echo signals and said positional signals, means responsive to said series of pulses producing a pair of timing waves in phase quadrature having a frequency which corresponds to the rotational rate of said antenna, a sweep generating circuit operable to generate a sweep voltage for said cathode ray tube in response to each of said pulses, means responsive to said timing waves producing rotation of said sweeps in synchronism with the rotation of said antenna, and means applying said echo signals and said positional signals to said cathode ray tube to present thereon said search data and the positional relationship of said antenna thereto.

2. A radar relay system for presenting on a remotely located cathode ray tube search data obtained by a radar system including a rotating directional antenna and a receiver of echo signals, and indicating on said cathode ray tube the range and bearing of said radar system from said remote cathode ray tube, comprising means coupled to said antenna producing a series of pulses the repetition rate of which is a predetermined multiple of the rate of rotation of said antenna, means operable by the rotation of said antenna periodically generating a positional signal indicative of the rotational position of said antenna, a source of carrier energy, means modulating said carrier energy with said echo signals, said pulses and said positional signals, a remotely located receiver responsive to said carrier energy, means coupled to said receiver separating said pulses from said echo signals and said positional signals, means responsive to said pulses producing a radial sweep on said cathode ray tube which rotates in synchronism with said antenna, means applying said echo signals and said positional signals to said cathode ray tube to present thereon said search data and the positional relationship of said antenna thereto, a pulse transmitter responsive to said pulse transmitting pulses of a frequency capable of reception by said rotating directional antenna, the pulses thus received by said rotating antenna being re-transmitted as an echo signal, received at said remote receiver and applied to said cathode ray tube, thereby to indicate thereon the range and bearing of said radar system.

3. In a radar relay system for presenting on a remotely located cathode ray tube search data obtained by a radar system including a rotating antenna, apparatus for producing a rotating radial sweep on said cathode ray tube in synchronism with the rotation of said antenna comprising, means operable by said rotating antenna generating a series of pulses the repetition rate of which is a predetermined multiple of the rate of rotation of said antenna, a source of carrier energy, means for modulating said carrier energy with said pulses, a remotely located receiver responsive to said carrier energy for detecting said pulses, a frequency divider being operable to divide the frequency of said pulses by the aforesaid multiple, means operable by said pulses of divided frequency producing a pair of timing waves in phase quadrature, a synchronous motor, said motor being energized by said timing waves, a sweep generator operable by said pulses of undivided frequency producing a radial sweep on said cathode ray tube, and a sine wave potentiometer being driven by said motor and coupled to said sweep generator to rotate said radial sweep at the same speed as said rotating antenna.

4. In a radar relay system for presenting on a remotely located cathode ray tube search data obtained by a radar system including a rotating antenna, apparatus for producing a rotating radial sweep on said cathode ray tube in synchronism with the rotation of said antenna and indicating on said cathode ray tube the angular direction of said antenna at a particular instant comprising, means operable by said rotating antenna generating a series of pulses the repetition rate of which is a predetermined multiple of the rate of rotation of said antenna, a cam operated switch operably coupled to said antenna, means generating a positional signal upon the closure of said switch at a predetermined rotational position of said antenna, a source of carrier energy, means for modulating said carrier energy with said pulses and said positional signals, a remotely located receiver responsive to said carrier energy for detecting said pulses and said positional signals, means coupled to said receiver for separating said pulses from said positional signals, means responsive to said pulses producing a pair of timing waves in phase quadrature having a frequency which corresponds to the rotational rate of said antenna, a sweep generating circuit operable to generate a sweep voltage for said cathode ray tube in response to each of said pulses, means responsive to said timing waves producing rotation of said sweeps in synchronism with the rotation of said antenna, and means applying said positional signals to said cathode ray tube to present on the face thereof an indication of the rotational position of said antenna at the aforesaid particular instant.

References Cited in the file of this patent

UNITED STATES PATENTS

| | | |
|---|---|---|
| 1,894,019 | Buckley | Jan. 10, 1933 |
| 2,363,941 | Busignies | Nov. 28, 1944 |
| 2,404,238 | Loughlin | July 16, 1946 |
| 2,406,751 | Emerson | Sept. 3, 1946 |
| 2,409,448 | Rost et al. | Oct. 15, 1946 |
| 2,409,456 | Tolson et al. | Oct. 15, 1946 |
| 2,412,669 | Bedford | Dec. 17, 1946 |
| 2,412,670 | Epstein | Dec. 17, 1946 |
| 2,468,045 | Deloraine | Apr. 26, 1949 |
| 2,471,516 | Bryant et al. | May 31, 1949 |
| 2,480,123 | Deloraine | Aug. 30, 1949 |
| 2,547,945 | Jenks | Apr. 10, 1951 |
| 2,552,172 | Hawes | May 8, 1951 |